US008850262B2

(12) United States Patent
Cardinell et al.

(10) Patent No.: US 8,850,262 B2
(45) Date of Patent: Sep. 30, 2014

(54) INTER-PROCESSOR FAILURE DETECTION AND RECOVERY

(75) Inventors: Charles S. Cardinell, Tucson, AZ (US); Roger G. Hathorn, Tucson, AZ (US); Bernhard Laubli, Tucson, AZ (US); Timothy J. Van Patten, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/902,501

(22) Filed: Oct. 12, 2010

(65) Prior Publication Data

US 2012/0089861 A1 Apr. 12, 2012

(51) Int. Cl.
*G06F 11/00* (2006.01)
*G06F 11/07* (2006.01)

(52) U.S. Cl.
CPC ........ *G06F 11/0757* (2013.01); *G06F 11/0724* (2013.01)
USPC .................... 714/10; 714/2; 714/4.2; 714/11; 714/47.1; 714/47.2

(58) Field of Classification Search
USPC .......................... 714/2, 10, 4.2, 11, 47.1, 47.2
See application file for complete search history.

(56) References Cited

U.S. PATENT DOCUMENTS

| | | | |
|---|---|---|---|
| 5,647,035 A * | 7/1997 | Cadeddu et al. ............... 385/24 |
| 6,147,968 A * | 11/2000 | De Moer et al. ............... 370/225 |
| 6,222,653 B1 * | 4/2001 | Asahi ................................ 398/4 |
| 6,259,837 B1 * | 7/2001 | de Boer et al. ................. 385/24 |
| 6,278,695 B1 * | 8/2001 | Christensen et al. ......... 370/254 |
| 6,687,853 B1 * | 2/2004 | Driever et al. .................. 714/16 |
| 6,711,700 B2 | 3/2004 | Armstrong et al. |
| 6,889,338 B2 * | 5/2005 | Srinivasan et al. ............. 714/4.1 |
| 6,973,267 B1 * | 12/2005 | Arecco et al. ..................... 398/4 |
| 7,028,218 B2 | 4/2006 | Schwarm et al. |
| 7,072,580 B2 * | 7/2006 | Arecco et al. ..................... 398/4 |
| 7,219,254 B2 | 5/2007 | Rathunde et al. |
| 7,421,478 B1 | 9/2008 | Muchow |
| 7,664,026 B2 | 2/2010 | Huang et al. |
| 7,716,520 B2 | 5/2010 | Tabei et al. |
| 7,774,480 B1 | 8/2010 | Murphy et al. |

(Continued)

OTHER PUBLICATIONS

Hoffmann et al.; "Application Heartbeats: A Generic Interface for Specifying Program Performance and Goals in Autonomous Computing Environments", ACM, Jun. 2010, pp. 79-88.

(Continued)

*Primary Examiner* — Loan L. T. Truong
(74) *Attorney, Agent, or Firm* — Kunzler Law Group (57) ABSTRACT

An approach to detecting processor failure in a multi-processor environment is disclosed. The approach may include having each CPU in the system responsible for monitoring another CPU in the system. A $CPU_n$ reads a $timestamp_{n+1}$ created by $CPU_{n+1}$ which $CPU_n$ is monitoring from a shared memory location. The $CPU_n$ reads its own $timestamp_n$ and compares the two timestamps to calculate a delta value. If the delta value is above a threshold, the $CPU_n$ determines that $CPU_{n+1}$ has failed and initiates error handling for the CPUs in the system. One CPU may be designated a master CPU, and be responsible for beginning the error handling process. In such embodiments, the $CPU_n$ may initiate error handling by notifying the master CPU that $CPU_{n+1}$ has failed. If $CPU_{n+1}$ is the master CPU, the $CPU_n$ may take additional steps to initiate error handling, and may broadcast a non-critical interrupt to all CPUs, triggering error handling.

19 Claims, 6 Drawing Sheets

(56) References Cited

U.S. PATENT DOCUMENTS

| | | | |
|---|---|---|---|
| 7,805,072 B2* | 9/2010 | Lovisa et al. | 398/4 |
| 8,438,626 B2* | 5/2013 | Anderson et al. | 726/11 |
| 2002/0055978 A1* | 5/2002 | Joon-Bo et al. | 709/209 |
| 2002/0059509 A1* | 5/2002 | Sasaki | 712/19 |
| 2002/0169861 A1* | 11/2002 | Chang et al. | 709/223 |
| 2005/0076127 A1* | 4/2005 | Wilson et al. | 709/227 |
| 2005/0207387 A1* | 9/2005 | Middleton et al. | 370/347 |
| 2006/0041660 A1* | 2/2006 | Bishop et al. | 709/224 |
| 2006/0224928 A1* | 10/2006 | Cardinell et al. | 714/45 |
| 2007/0180493 A1* | 8/2007 | Croft et al. | 726/2 |
| 2008/0126707 A1* | 5/2008 | Sistla | 711/118 |
| 2009/0043887 A1* | 2/2009 | Coekaerts | 709/224 |
| 2009/0307526 A1 | 12/2009 | Ohira | |
| 2010/0058095 A1* | 3/2010 | Malek | 713/375 |
| 2010/0058101 A1* | 3/2010 | Shahid et al. | 713/500 |
| 2010/0262717 A1* | 10/2010 | Critchley et al. | 709/251 |
| 2010/0268808 A1* | 10/2010 | Chkodrov et al. | 709/223 |
| 2010/0325257 A1* | 12/2010 | Goel et al. | 709/223 |
| 2011/0295587 A1* | 12/2011 | Eeckhout et al. | 703/21 |

OTHER PUBLICATIONS

Peng et al.; "Design of a Message-Based Inter-Process Communication Method for Multi-CPU Embedded Systems", IEEE 2009, pp. 122-126.

* cited by examiner

FIG. 6

INTER-PROCESSOR FAILURE DETECTION AND RECOVERY

FIELD

The subject matter disclosed herein relates to detecting processor failure and recovering from the same in a multi-processor environment.

BACKGROUND

Description of the Related Art

More and more computers and systems are taking advantage of the opportunities that are afforded by using multiple processors. Multi-core systems are becoming increasingly popular and offer a variety of benefits. One of the challenges associated with multi-processor systems that have multiple central processing units (CPUs) is the problem associated with ensuring that each CPU is operational and completing tasks in a reasonable amount of time. Those in the art commonly use the term "heartbeat algorithm" to refer to for approaches to ensuring the functionality and responsiveness of CPUs in a multi-processor environment.

While there are various heartbeat algorithms currently available, they may suffer from various problems. Certain approaches use a master CPU monitoring one or more slave CPUs. However, if the master CPU fails, the failure may be undetectable. In addition, certain approaches use messaging to communicate heartbeats. One CPU sends a message to one or more of the other CPUs in the system, which respond. The use of messages generally causes interruptions in the operations of the CPUs, and can lead to inefficiencies. These inefficiencies may be particularly acute in certain environments, such as Fibre Channel.

BRIEF SUMMARY

The present invention allows for detecting processor failures in a multi-processor environment. The invention may be realized as an apparatus, a computer program product, a method, a system, or in other forms.

An apparatus for detecting processor failure in a multi-processor device may include a variety of modules. In one embodiment, the apparatus includes a retrieval module that retrieves a timestamp$_{n+1}$ generated by a CPU$_{n+1}$ from a shared memory that is shared by a number of CPUs. A comparison module may compare the timestamp$_{n+1}$ to a timestamp$_n$ that is generated by the CPU$_n$ that is checking the CPU$_{n+1}$ for failure. The comparison module may, based on this comparison, determine a delta value. The delta value may represent the difference between the two timestamps. The comparison module may compare the delta value with a threshold value and thereby determine whether the CPU$_{n+1}$ has failed. The apparatus may also include a detection module that may, if the comparison module determines that the CPU$_{n+1}$ has failed, initiate error handling for the CPUs in the system.

In certain embodiments, the comparison module may add additional time to the timestamp$_n$ before comparing it to timestamp$_{n+1}$. The additional time may account for the time to move the timestamp$_{n+1}$ from CPU$_{n+1}$ to CPU$_n$. The additional time may also account for any differences in clock synchronization.

In certain embodiments, the apparatus may include a timestamp module that reads the timestamp$_n$ from hardware and writes the timestamp$_n$ to the shared memory. The timestamp module may perform this action as part of the process of checking CPU$_{n+1}$ described above. The timestamp module may also perform this action at other times, if required by the particular implementation. In certain embodiments, all CPUs write their timestamps to a global array implemented using the shared memory, and each CPU has its own cache line for writing timestamps.

The threshold value may be set lower than a system threshold value which is used by the system in which the multi-processor device operates.

The steps taken in response to the CPU$_n$ detecting that the CPU$_{n+1}$ has failed may vary based on whether the CPU$_n$ or the CPU$_{n+1}$ is the master CPU in the system. If neither CPU$_{n+1}$ nor CPU$_n$ is the master CPU, the CPU$_n$ initiating error handling may involve the CPU$_n$ notifying the master CPU of the failure on CPU$_{n+1}$. The master CPU may then cause the CPUs in the system to perform error handling. If the CPU$_{n+1}$ is the master CPU, the detection module may send a non-critical interrupt to CPU$_{n+1}$ and wait for a response. If the CPU$_{n+1}$ does not respond, the detection module may send a critical interrupt. If the CPU$_{n+1}$ still does not response, the detection module may broadcast a group non-critical interrupt to all CPUs, which group non-critical interrupt causes the CPUs to perform error handling.

The present invention may also be realized as part of a larger system. In one embodiment, the CPUs and the shared memory are components of a Fibre Channel storage host adapter. In such an embodiment, the threshold value may be set lower than the threshold value for the storage host adapter. The present invention may also be realized as a method for detecting processor failure in a multi-processor environment.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
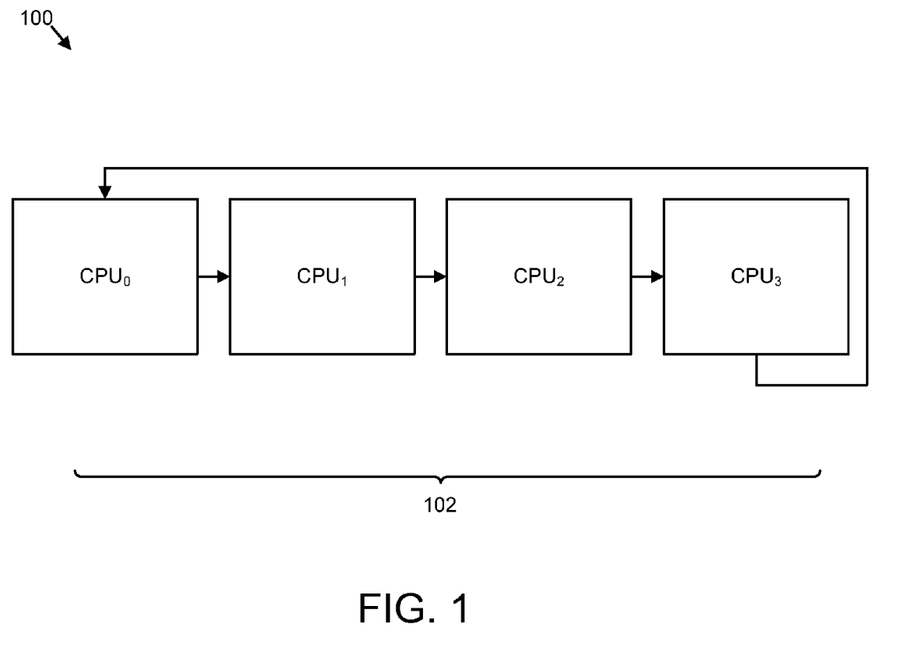
FIG. 1 is a schematic block diagram illustrating one embodiment of a system for detecting processor failure.

FIG. 1 shows one embodiment of a system 100 which includes multiple central processing units (CPUs) (also commonly referred to as processors), designated $CPU_0$, $CPU_1$, $CPU_2$, and $CPU_3$ respectively (and referred to collectively as CPUs 102). The CPUs 102 perform logical and arithmetic operations on data as specified in instructions. The CPUs 102 may be implemented on multiple separate chips, or on a single chip. Thus, in certain embodiments, the CPUs 120 may be core in a multi-core processor. The number of CPUs 120 may vary in different implementations; in one embodiment, the system 100 may be a dual-core processor with $CPU_0$ and $CPU_1$. In other embodiments, the system 100 may use a quad-core processor (as shown), a hexa-core processor, octo-core processor, or other. The number of CPUs 120 may vary based on the needs of the system 100. Similarly, the CPUs 120 not be identical; for example, certain CPUs 120 may be optimized to perform certain functions, such as support for graphics.

The system 100 may be configured to implement a heartbeat algorithm which monitors the CPUs 120 in the system 100 for failure. In one embodiment, each CPU 120 checks another CPU 120 for failure. Thus, as shown in FIG. 100, $CPU_0$ checks $CPU_1$, $CPU_1$ checks $CPU_2$, and so on until the end. The last CPU ($CPU_3$) checks the first CPU ($CPU_0$). In this fashion, each CPU 120 may check another CPU 120 in the system 100 to monitor the CPUs 120 in the system 100. Failure may refer to a broad variety of problems. Failure may simply mean that a particular CPU 120 is not responding within an allocated period of time, or that the particular CPU 120 did not write its timestamp within an allocated period of time.

In certain embodiments, one CPU 120 may be designated the master CPU 120, and other CPUs 120 may be designated slave CPUs 120. For example, the $CPU_0$ may be the master. In certain embodiments, the master CPU 120 is responsible for initiating error handling in the system 100. In certain embodiments, where the master CPU 120 is in failure, one or more of the slave CPUs 120 may initiate error handling in the system 100. In certain embodiments, the CPUs 120 use timestamps to determine whether another CPU 120 has failed. For example, the $CPU_0$ may retrieve a timestamp generated by $CPU_1$, compare that timestamp with a timestamp generated by $CPU_0$, and determine whether the $CPU_1$ has failed.

Error handling may encompass a wide variety of actions that may be taken in response to determining that a CPU 120 in the system has failed. Error handling may include, for example, logging data concerning the state of the CPU 120 leading up to the failure, putting the overall system (such as an adapter) in a known state such that data concerning the failure can be collected, reading hardware registers, building informational records, and shutting down CPUs that are slave CPUs. Error handling may also include attempts to gracefully survive whatever condition caused the failure. These are simply examples of operations that may constitute error handling; particular implementations may contain more or fewer than the examples given above. Those of skill in the art will appreciate the various actions that may constitute error handling.

Figure 2:
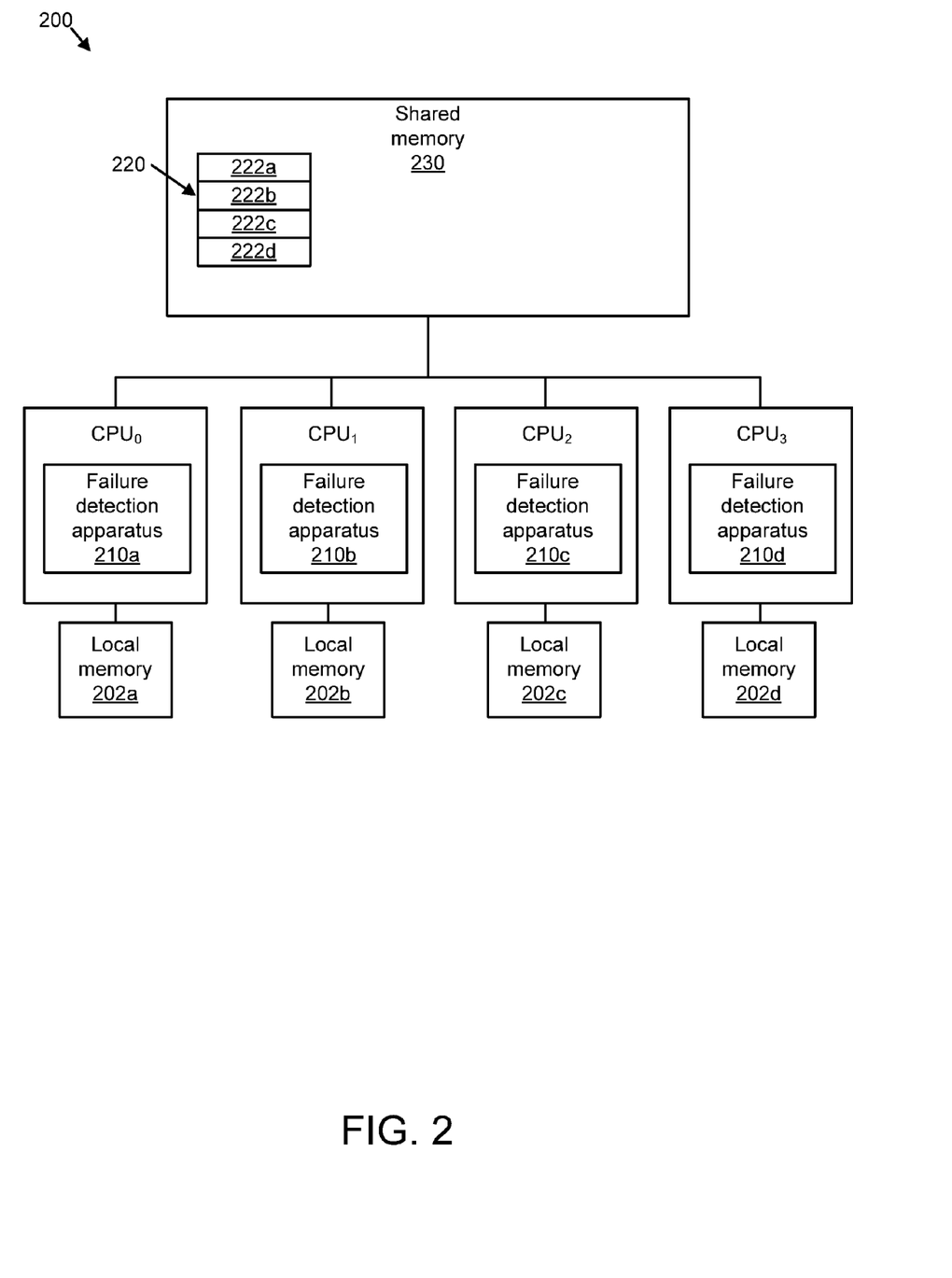
FIG. 2 is a schematic block diagram illustrating an embodiment of a system including a plurality of CPUs and a shared memory location.

FIG. 2 shows one embodiment of a system 200 for detecting processor failures in a multi-processor device. The system 200 includes CPUs 120 which are labeled $CPU_0$, $CPU_1$, $CPU_2$, and $CPU_3$. The system 200 may also include local memory 202 for the CPUs 120, and shared memory 230.

In certain embodiments, the local memory 202 is the local cache memory for the CPUs 120. The local memory 202 is typically small, fast memory which stores copies of the data in main memory that is most frequently used. The local memory 202 may include one or more caches; for example, the local memory 202 may include an instruction cache, a data cache, and a translation lookaside buffer. The local memory 202 may also be referred to as a Level 1 (L1) cache. Various approaches to implementing the local memory 202 may be used. The local memory 202 is used by the associated CPU 120; thus, local memory 202a is used by $CPU_0$, local memory 202b is used by $CPU_1$, and so on.

The system 200 may also include a shared memory 230. The shared memory 230 may also be referred to as a Level 2 (L2) cache. Shared memory 230 is generally larger than the local memory 202. The shared memory 230 is also used by, and accessible to, each of the CPUs 120 connected to the shared memory 230. The shared memory 230 and the local memory 202 may be strictly inclusive, exclusive, or mainly inclusive. Various ways in which a shared memory 230 may be implemented in conjunction with local memory 202 may be used.

In certain embodiments, the shared memory 230 is used to implement a global array 220 for the CPUs 120. The global array 220 provides an efficient manner for the CPUs 120 to share information through the shared memory 230. In certain embodiments, the global array 220 is implemented using the Global Arrays (GA) toolkit which provides efficient and portable shared-memory programming interface for distributed-memory systems. The global array model may expose to the programmer the non-uniform memory access characteristics of the system 200 and make locality information for shared data available, along with direct access to the local portions of shared data.

As mentioned in connection with FIG. 1, the CPUs 120 may use timestamps in order to determine whether or not a CPU 120 has failed. In certain embodiments, the CPUs 120 write timestamps to the global array 220. In certain embodiments, each CPU 120 is allocated a separate cache line 222 of the global array 220 to write timestamps. FIG. 2 shows a global array 220 with four cache lines 222a-d. The number of cache lines 222 for the global array 220 may vary based on the particular implementation. Allocating a separate cache line 222 for each CPU 120 may improve performance by preventing multiple CPU 120 writes to the same cache line 222, which can cause cache trashing during frequent timestamp updates by every CPU 120.

In certain embodiments, the CPUs 120 implement a failure detection apparatus 210. The failure detection apparatus 210 facilitates detecting and responding to CPU 120 failures in the system 200. The failure detection apparatus 210 may be implemented in software, firmware, hardware, or some combination thereof for the CPU 120. In certain embodiments, the CPUs 120 having the failure detection apparatuses 210 are configured to detect failures in other CPUs 120 in the system 200.

As noted in connection with FIG. 1, a particular CPU. may be configured to detect a failure in $CPU_{n+1}$. "$CPU_n$" refers to any single CPU 120 in the system 200 (such as $CPU_0$) and "$CPU_{n+1}$" refers to any CPU 120 in the system 200 distinct from $CPU_n$. This notation, as used in this application, does not specify or require any additional relationship between the CPUs. For example, this notation does not require that the $CPU_n$ and the $CPU_{n+1}$ be in some logical or physical sequence; thus, $CPU_n$ may be $CPU_1$, and $CPU_{n+1}$ may be $CPU_3$. Similarly, $CPU_n$ may be $CPU_3$, while $CPU_{n+1}$ may be $CPU_0$. The "n" "n+1" notation is simply used to convey that the $CPU_n$ and $CPU_{n+1}$ are distinct CPUs 120. The interpretation this notation precludes is an interpretation that $CPU_n$ is $CPU_0$ and that $CPU_{n+1}$ is also $CPU_0$. Similarly, this application may discuss a $timestamp_n$ and a $timestamp_{n+1}$. These refer to timestamps generated by $CPU_n$ and $CPU_{n+1}$ respectively. The subscripts refer to the origins of the timestamp (i.e., which CPU 120 created them) and does not specify any relationship between the timestamps.

A $CPU_n$ may be configured to retrieve a timestamp generated by $CPU_{n+1}$ (which is referred to as $timestamp_{n+1}$) from the shared memory 230. The $CPU_n$ may then compare the $timestamp_{n+1}$ with a $timestamp_n$ generated by the $CPU_n$ and determine a delta value. The delta value represents the difference between $timestamp_n$ and $timestamp_{n+1}$. The $CPU_n$ may then compare the delta value with a threshold value and determine whether the $CPU_{n+1}$ has failed based on the comparison between the delta value and the threshold value. For example, the $CPU_n$ may determine that the $CPU_{n+1}$ has failed if the delta value equals or is greater than the threshold value. If the $CPU_n$ determines that the $CPU_{n+1}$ has failed, the $CPU_n$ initiates error handling for the CPUs 120. The $CPU_n$ may directly initiate error handling, or may initiate error handling through another CPU 120. For example, if the $CPU_n$ is a slave CPU, the $CPU_n$ may cause the master CPU to begin error handling.

The threshold value may represent a period of time during which a CPU 120 must provide a timestamp. For example, the threshold value may be 250 milliseconds. If the CPU 120 being tested (such as $CPU_{n+1}$) has not updated its timestamp in the last 250 milliseconds, the testing CPU 120 (such as $CPU_n$) determines that the CPU 120 being tested has failed. In such an embodiment, if the $CPU_{n+1}$ fails to update its $timestamp_{n+1}$ within a given period time defined by the threshold value, the $CPU_n$ will determine that the $CPU_{n+1}$ has failed and begin error handling operations.

In certain embodiments, the threshold value is large enough that the $CPU_{n+1}$ must have failed to write its $timestamp_{n+1}$ multiple times before the $CPU_n$ determines that the $CPU_{n+1}$ has failed. For example, the threshold value may be 250 milliseconds, and the $CPU_{n+1}$ may be configured to write its $timestamp_{n+1}$ every millisecond. In such an embodiment, $CPU_n$ would not determine that the $CPU_{n+1}$ has failed unless the $CPU_{n+1}$ has missed providing its $timestamp_{n+1}$ 250 times.

As an example, $CPU_n$ may refer to $CPU_0$ and $CPU_{n+1}$ may refer to $CPU_1$. $CPU_0$ may retrieve the $timestamp_1$ generated by $CPU_1$ out of the shared memory 230 and compare $timestamp_1$ with $timestamp_0$, generated by $CPU_0$. $CPU_0$ may determine the delta value associated with $timestamp_1$ and $timestamp_0$ and compare the delta value with a threshold value to determine whether $CPU_1$ has failed. In one embodiment, the threshold value may be 250 milliseconds. In one embodiment, if the delta value is larger than 250 milliseconds, the $CPU_0$ determines that $CPU_1$ has failed and initiates error handling for the CPUs 120.

Figure 3:
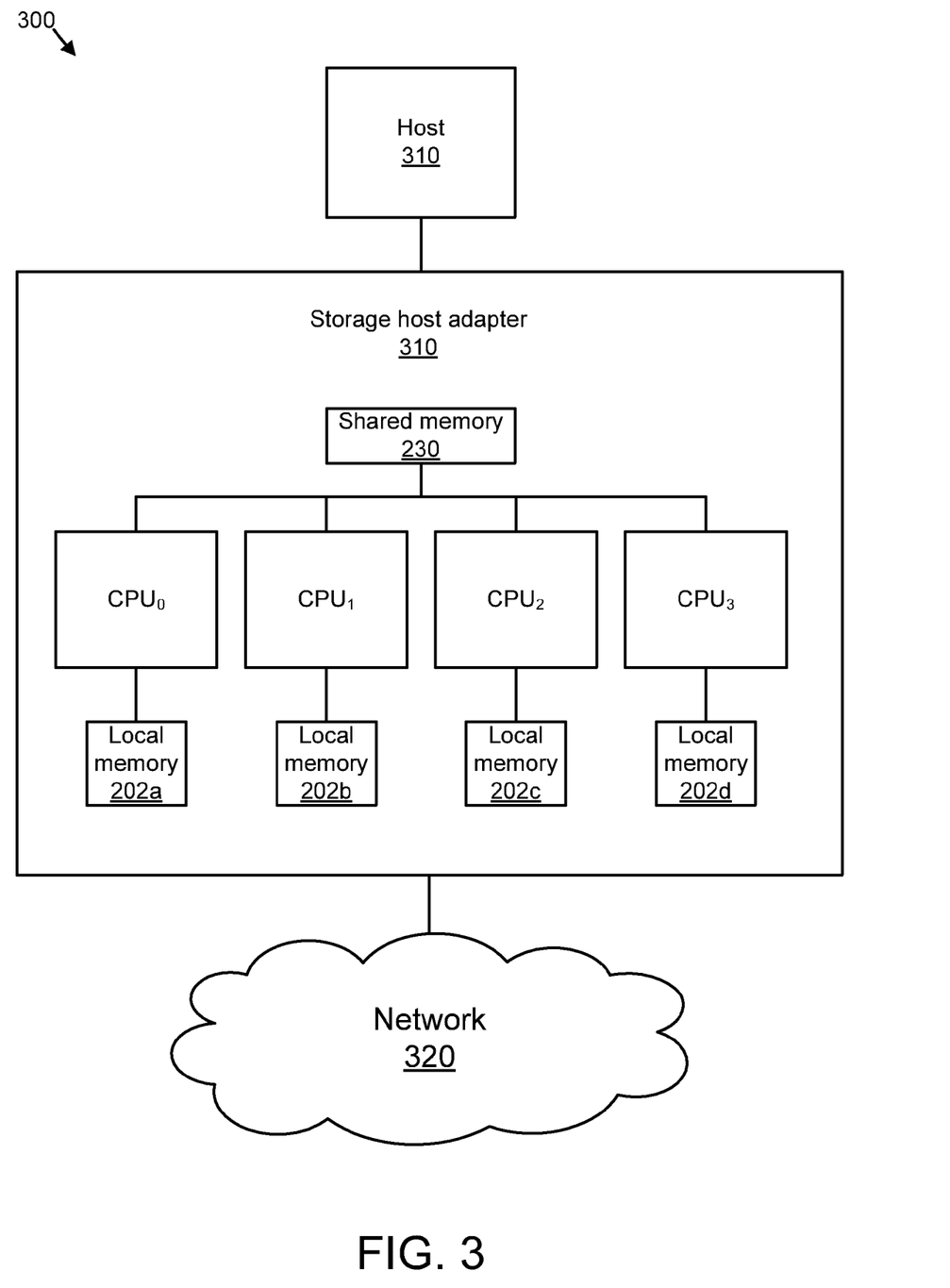
FIG. 3 is a schematic block diagram illustrating an embodiment of a system with a host, a storage host adapter that includes a plurality of CPUs, and a network.

FIG. 3 shows one embodiment of a system 300 for detecting processor failure in a multi-processor device. The shared memory location 230, CPUs 120, and local memories 202 may be part of a Fibre Channel storage host adapter 310. The storage host adapter 310 (also commonly referred to as a host bus adapter (HBA), host adapter, and host controller) connects a host 310 to other network and storage devices over a network 320. The storage host adapter 310 may have a unique world wide name (WWN). The storage host adapter 310 may have a node WWN shared by all ports on the storage host adapter 310, and a port WWN that is unique to each port.

The host 310 may be any appropriate computing device which can send and receive information over the network 320. The storage host adapter 310 facilitates communication of data over the network 320 in accordance with the Fibre Channel protocol. The storage host adapter 310 may be physically integrated into the host 310.

In certain embodiments, there is a system threshold value associated with the storage host adapter 310. For example, the host 310 with which the storage host adapter 310 communicates may implement a system threshold value. In one embodiment, if the storage host adapter 310 fails to respond to requests for communication within a time period represented by the system threshold value, the host 310 may initiate error handling for the storage host adapter 310. In one embodiment, the system threshold value is 500 milliseconds. In certain embodiments, the threshold value used to detect failures of CPUs 120 in the storage host adapter 310 is set lower than the system threshold value for the storage host adapter 310. In such embodiments, the CPUs 120 in the storage host adapter 310 will detect a CPU failure and initiate error handling for the CPUs 120 before the host 310 detects an error in the storage host adapter 310 caused by the CPU failure and initiates error handling for the storage host adapter 310.

Figure 4:
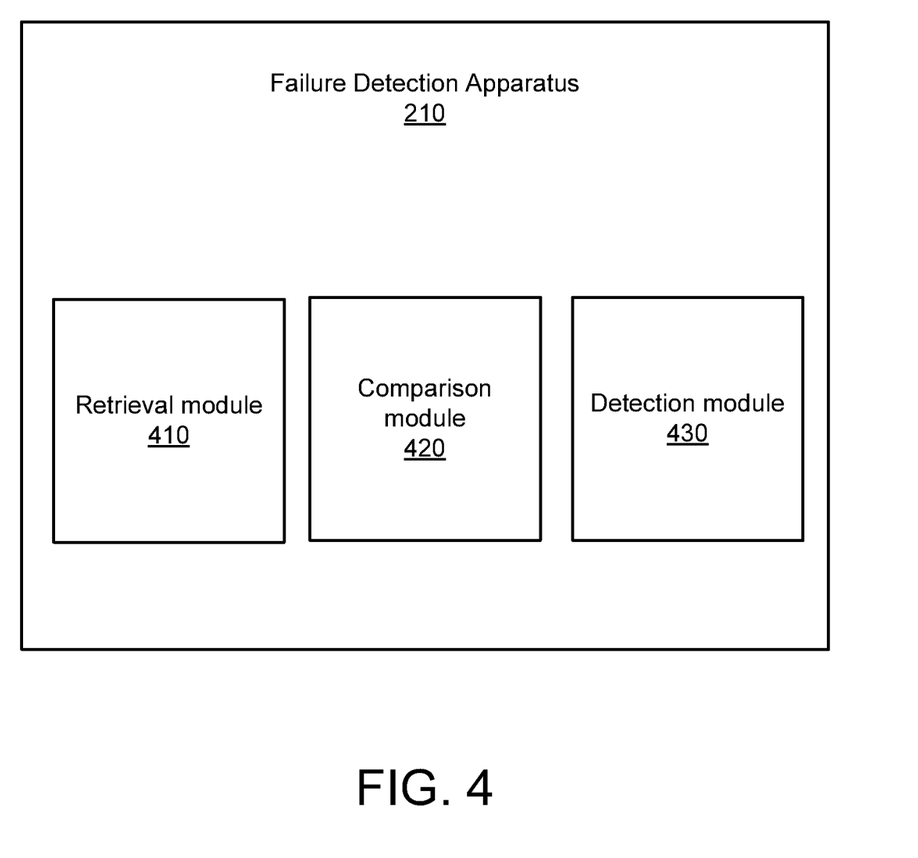
FIG. 4 is a schematic block diagram illustrating an embodiment of a failure detection apparatus.

FIG. 4 shows one embodiment of a failure detection apparatus 210. In one embodiment, the failure detection apparatus 210 includes a retrieval module 410, a comparison module 420, and a detection module 430. The failure detection apparatus 210 and its associated modules may be realized in software, hardware, firmware, or some combination thereof. In certain embodiments, functions of the modules are realized using scan loops.

The failure detection apparatus 210 may be implemented on a $CPU_n$. The retrieval module 410 is configured to retrieve a $timestamp_{n+1}$ from the shared memory 230 that is shared by a plurality of CPUs 120. The $timestamp_{n+1}$ is written to the shared memory 230 by a $CPU_{n+1}$. The failure detection apparatus 210 may also include a comparison module 420 configured to compare the $timestamp_{n+1}$ with a $timestamp_n$ generated by the $CPU_n$ that is checking the $CPU_{n+1}$ for failure. The comparison module 420 may determine a delta value based on the comparison of $timestamp_{n+1}$ $timestamp_n$. The delta value represents the difference between the $timestamp_{n+1}$ and $timestamp_n$.

The comparison module 420 may compare the delta value against a threshold value and determine, based at least in part on that comparison, whether the $CPU_{n+1}$ has failed. For example, the delta value may represent the difference between the $timestamp_{n+1}$ and the $timestamp_n$. This may be an approximation of the amount of time that has passed since $CPU_{n+1}$ last updated its $timestamp_{n+1}$. The threshold value may represent the maximum amount of time that can pass since the last time $CPU_{n+1}$ updated its $timestamp_{n+1}$ before $CPU_{n+1}$ will be considered to be in failure. In such an embodiment, if the threshold value is 250 milliseconds, and the delta value is 300 milliseconds, the comparison module 420 will compare the delta value and the threshold value and determine that the $CPU_{n+1}$ has failed. The detection module 430 is configured to initiate error handling for the CPUs 120 if the comparison module 420 determines that the $CPU_{n+1}$ has failed.

In certain embodiments, the comparison module 420 may guarantee that its $timestamp_n$ is more recent than the $timestamp_{n+1}$. In certain embodiments, the comparison module 420 adds additional time to the $timestamp_n$ prior to comparing the $timestamp_n$ to the $timestamp_{n+1}$. The additional time may be added to account for the time to move the $timestamp_{n+1}$ from $CPU_{n+1}$ to the shared memory 230 and then to the $CPU_n$.

In certain embodiments, the $CPU_n$ may guarantee that its timestamp, $timestamp_n$, is more recent than the $timestamp_{n+1}$ of $CPU_{n+1}$. In such embodiments, the $CPU_n$ may read the $timestamp_{n+1}$ before reading $timestamp_n$ out of the hardware for $CPU_n$. As noted above, $CPU_n$ may then add additional time to $timestamp_n$. As noted above, this additional time may account for the time that was required to move the $timestamp_{n+1}$ from $CPU_{n+1}$'s local hardware to $CPU_n$'s local hardware. The additional time may also account for any differences in the time bases between $CPU_n$ and $CPU_{n+1}$ (the time base synchronization's margin of error).

The comparison module 420 may also be configured to account for timestamp wrapping; that is, a system using a plurality of CPUs 120 implementing this approach to failure detection may be running for longer than number of bits allocated for the timestamp can record. In such embodiments, the timestamps may wrap back around. The comparison module 420 may be configured to detect when a timestamp has wrapped, and account for such wrapping in making the comparisons between timestamps.

Figure 5:
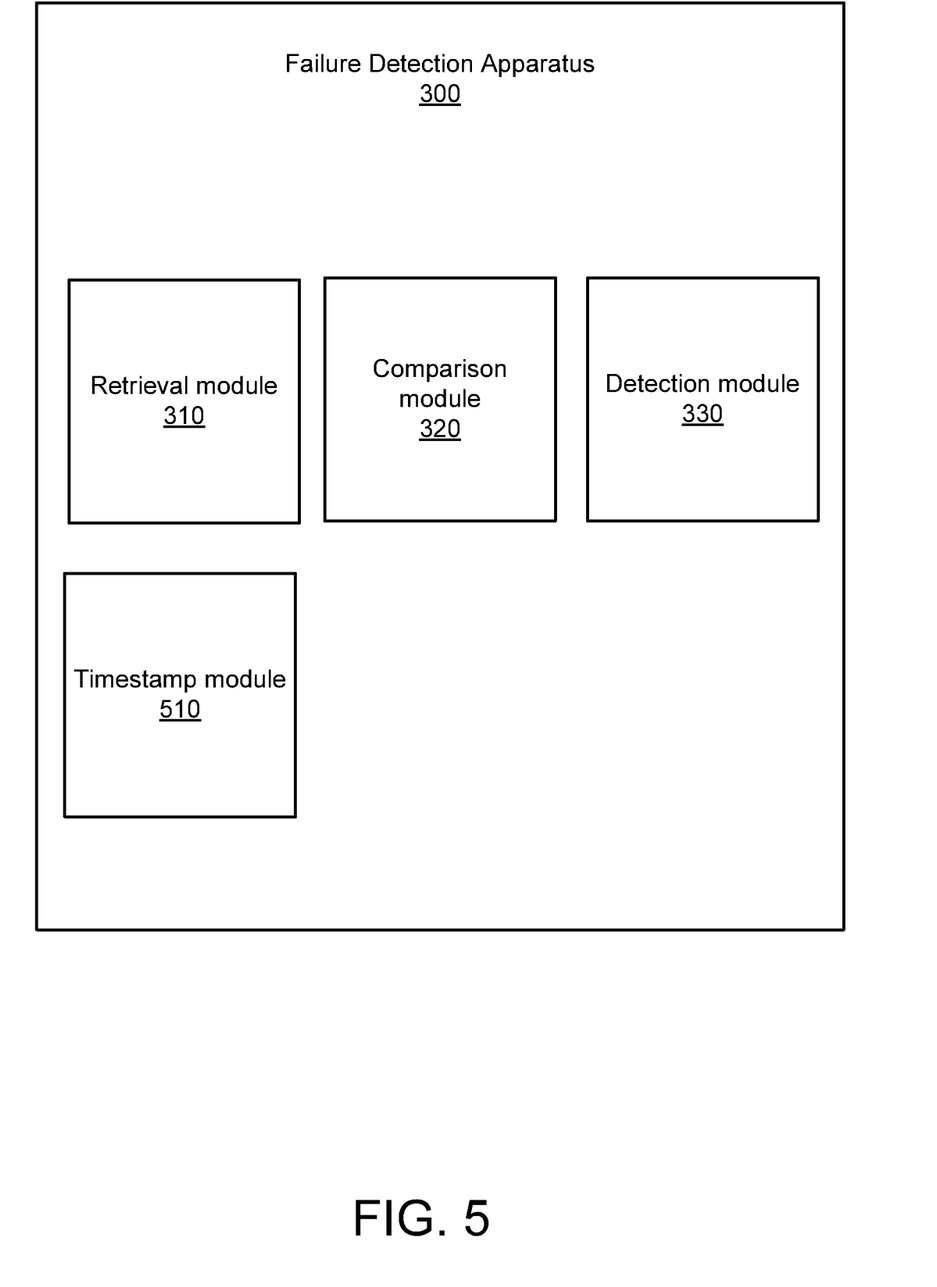
FIG. 5 is a schematic block diagram illustrating another embodiment of a failure detection apparatus.

FIG. 5 shows an embodiment of a failure detection apparatus 300 which includes a timestamp module 510. The timestamp module 510 may be configured to read the timestamp of the CPU 120 implementing the failure detection apparatus 300 from the CPU 120's hardware and write the timestamp to the shared memory 230. For a $CPU_n$ implementing the failure detection apparatus 300, the timestamp module 510 may read the $timestamp_n$ from hardware and write the $timestamp_n$ to the shared memory 230. The timestamp module 510 may write the $timestamp_n$ directly to the shared memory 230. This is in contrast to systems where a $timestamp_n$ may be sent in a message into a quorum file. Writing the $timestamp_n$ directly to the shared memory 230 does not encompass using a message.

Thus, in one embodiment, operation of a failure detection apparatus 300 for a $CPU_n$ may proceed as follows. The retrieval module 310 may retrieve the $timestamp_{n+1}$ generated by $CPU_{n+1}$ from the shared memory 230. The timestamp module 510 may read the $timestamp_n$ for the $CPU_n$ out of hardware for the $CPU_n$ and write the $timestamp_n$ to the shared memory 230. The comparison module 320 may then add additional time to the $timestamp_n$ and compare the $timestamp_n$ with the $timestamp_{n+1}$. In one embodiment, if the delta value obtained by subtracting $timestamp_{n+1}$ from $timestamp_n$ is larger than a threshold value, the comparison module 320 determines that the $CPU_{n+1}$ has failed and the detection module 330 initiates error handling for the CPUs 120 in the system.

In the example given above, the timestamp module 510 wrote the $timestamp_n$ to the shared memory 230 as part of the process of checking $CPU_{n+1}$. The timestamp module 510 may be configured to read the $timestamp_n$ from hardware and write the $timestamp_n$ to the global array implemented in shared memory 230 independent of the failure detection apparatus 210 checking whether the $CPU_{n+1}$ has updated its $timestamp_{n+1}$ within the allocated time interval. In certain embodiments, the timestamp module 510 regularly writes the $timestamp_n$ to the global array separate from the process whereby $CPU_n$ checks the heartbeat of $CPU_{n+1}$. In certain embodiments, the $CPU_n$ writes its $timestamp_n$ to shared memory 230 every three microseconds and checks the $timestamp_{n+1}$ every millisecond. The ratio of $CPU_n$ writing its $timestamp_n$ to $CPU_n$ checking whether $CPU_{n+1}$ has timed out (and being checked for timeout) may be 1 to 1000.

In certain embodiments, the timestamp module 510 writing the $timestamp_n$ is designated a high priority operation, while the operations necessary for checking $CPU_{n+1}$ is designated a lower priority operation. The timestamp module 510 may read a timestamp$_n$ and write the timestamp$_n$ to a global array in shared memory 230 with each pass of the scan loop.

The steps involved in initiating error handling may vary based on whether the CPU$_n$ detecting the failure is the master CPU or a slave CPU, and based on whether the CPU$_{n+1}$ that has failed is the master CPU or a slave CPU. Where the CPU$_n$ is the master CPU, the CPU$_n$ may cause each of the slave CPUs to begin error handling. Where CPU$_n$ is a slave CPU, the CPU$_n$ may notify the master CPU that CPU$_{n+1}$ has failed and instruct the master CPU to cause each of the slave CPUs to begin error handling. Where the CPU$_{n+1}$ which has failed is the master CPU, the CPU$_n$ may attempt to get the failed master CPU to respond to interrupts, as described in greater detail below. If the master CPU still fails to respond, the CPU$_n$ may cause the other slave CPUs to begin handling.

Figure 6:
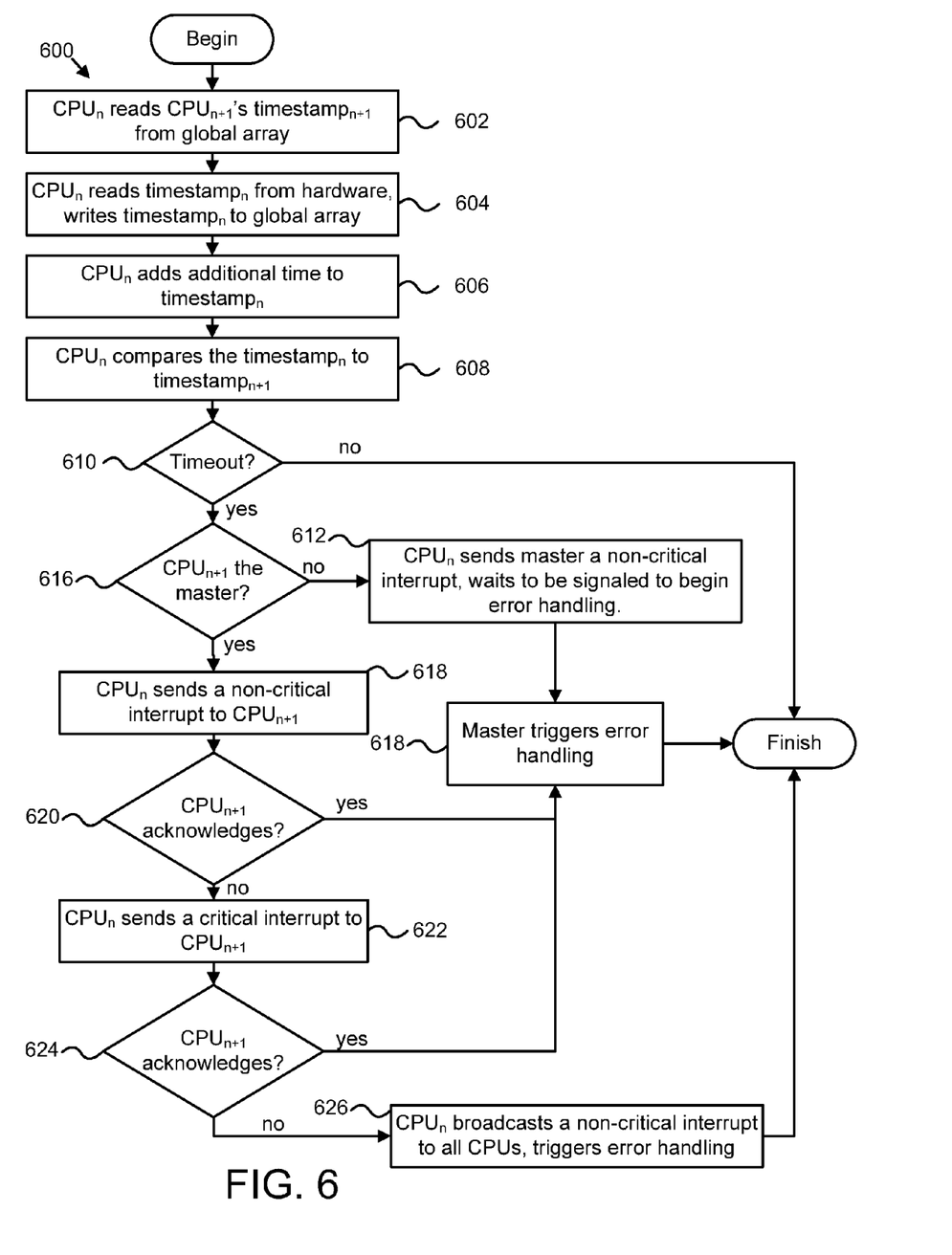
FIG. 6 is a flow chart diagram illustrating a method for detecting processor failure in a multi-processor environment.

FIG. 6 shows one embodiment of a method 600 for detecting processor failure in a multi-processor device. The FIG. 6 is presented from the perspective of a CPU$_n$ that is checking a CPU$_{n+1}$ for failures. The method 600 begins with CPU$_n$ reading 602 CPU$_{n+1}$'s timestamp$_{n+1}$ from a global array in shared memory 230. Reading is one way in which the CPU$_n$ may retrieve the timestamp$_{n+1}$. The method 600 continues with the CPU$_n$ reading 604 the timestamp$_n$ from CPU$_n$'s hardware and writing the timestamp$_n$ to the global array in the shared memory 230. The CPU$_n$ may write the timestamp$_n$ to the global array as part of the process of checking the CPU$_{n+1}$ to ensure that the CPU 120 that is checking CPU$_n$ for failures (CPU$_{n-1}$) does not detect a timeout while CPU$_n$ is checking CPU$_{n+1}$.

The method 600 may also involve the CPU$_n$ adding 606 additional time to the timestamp$_n$ to account for differences in clocks and for the time necessary to move the timestamp$_{n+1}$ from CPU$_{n+1}$ through the shared memory 230 to the CPU$_n$. The CPU$_n$ may then compare 608 the timestamp$_n$ with the timestamp$_{n+1}$ and determine a delta value. Using this delta value, the CPU$_n$ can determine 610 whether the CPU$_{n+1}$ has timed out.

If the CPU$_{n+1}$ has not timed out (for example, if the delta value is lower than the threshold value), the CPU$_n$ continues to monitor the CPU$_{n+1}$ for failure. If the CPU$_{n+1}$ has timed out, this condition may cause the CPU$_n$ to determine that the CPU$_{n+1}$ has failed. The CPU$_n$ may next determine 616 if the CPU$_{n+1}$ is the master CPU. If the CPU$_{n+1}$ is not the master CPU, CPU$_n$ sends 612 the master CPU a non-critical interrupt and waits to be signaled to being error handling by the master CPU. The master CPU triggers 614 error handling in the CPUs 120 in the system, and the method 600 ends.

If the CPU$_{n+1}$ is the master CPU, a different approach to initiating error handling may be necessary. The CPU$_n$ may send 618 a non-critical interrupt to the CPU$_{n+1}$. If the CPU$_{n+1}$ has non-critical interrupts enabled, CPU$_n$ will indicate that the CPU$_{n+1}$ has failed the heartbeat and thus deemed to have failed. The CPU$_n$ may wait for CPU$_{n+1}$ to acknowledge the non-critical interrupt. CPU$_{n+1}$ may acknowledge the non-critical interrupt by sending an interrupt to the CPU$_n$ causing the CPU$_n$, along with the other CPUs 120 in the system, to initiate error handling.

If CPU$_{n+1}$ acknowledges 620 the non-critical interrupt, the master CPU (which is CPU$_{n+1}$ in this instance) triggers error handling and the method 600 ends. If the CPU$_{n+1}$ does not acknowledge the non-critical interrupt, the CPU$_n$ sends 622 a critical interrupt to the CPU$_{n+1}$. The critical interrupt may indicate to CPU$_{n+1}$ that it has failed the heartbeat and has failed to respond to the non-critical interrupt. CPU$_n$ may then wait for CPU$_{n+1}$ to acknowledge the critical interrupt. As above, CPU$_{n+1}$ may acknowledge the critical interrupt by initiating error handling for the CPUs 120. The CPU$_{n+1}$ may initiate error handling by broadcasting a non-critical interrupt to the CPUs 120, including CPU$_n$.

If the CPU$_{n+1}$ acknowledges 624 the critical interrupt, the master CPU triggers error handling as described above. If the CPU$_{n+1}$ fails to acknowledge the critical interrupt, the CPU$_n$ may broadcast 626 a non-critical interrupt to all CPUs 120 in the system to initiate error handling. In certain embodiments, the non-critical interrupt that is broadcast puts all CPUs 120 in a hang loop. In certain embodiments, the CPU$_n$ is unable to perform the full range of error handling that the master CPU offers, and the non-critical interrupt sent by the CPU$_n$ causes a reduced level of error handling to be performed. In certain embodiment, the CPU$_n$ simply halts all work being done by the slave CPUs such that the overall system becomes idle. Once the system is idle, a system component (such as a logical partition where the system includes a storage host adapter 310) may detect that the storage host adapter 310 is no longer responsive and begin error handling.

In one embodiment, the method 600 is also used to detect long running processes on the CPUs 120 in a system and may eliminate the need for each CPU 120 to police its own thread processing time. In such embodiments, each CPU 120 may be configured to update its own timestamp n number of times as it goes through the scan loop. If the collective times of processing the n threads dispatched by the CPU 120 exceeds the threshold value, then this may be detected or logged as an error.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   non-transitory computer readable storage medium storing computer readable prongram code executable by a plurality of centaral processing units (CPU), wherein the plurality of CPUs are configured in a ring and each CPU$_n$ determines whether a CPU$_{n+1}$ that is logically adjacent to the CPU$_n$ in the ring has failed, the computer readable program code comprising:
   a retrieval module of the CPU$_n$ configured to retrieve a timestamp$_{n+1}$ from a shared memory that is shared by the plurality of CPUs, wherein the timestamp$_{n+1}$ is written to the shared memory by the CPU$_{n+1}$, wherein the CPU$_n$ is a first core in a multi-core processor and the CPU$_{n+1}$ is a second core in a multi-core processor, the multi-core processor comprising a plurality of cores;
   a comparison module of the CPU$_n$ configured to compare the timestamp$_{n+1}$ to a timestamp$_n$ generated by a CPU$_n$ checking the CPU$_{n+1}$ for failure and determine a delta value;
   the comparison module of the CPU$_n$ further configured to compare the delta value with a threshold value and determine whether the CPU$_{n+1}$ has failed; and
   a detection module of the CPU$_n$ configured to, in response to the comparison module determining that the CPU$_{n+1}$ has failed, initiate error handling for the plurality of CPUs.

2. The apparatus of claim 1, the computer readable program code comprising further comprising a timestamp module to read the timestamp$_n$ from hardware and write the timestamp$_n$ to the shared memory.

3. The apparatus of claim 1, wherein the threshold value is set lower than a system threshold value for the system in which the multi-processor device operates.

4. The apparatus of claim 1, wherein the $CPU_{n+1}$ is not a master CPU and the $CPU_n$ is not the master CPU, initiating error handling comprising the $CPU_n$ notifying the master CPU of the failure on $CPU_{n+1}$, and wherein the master CPU causes the plurality of CPUs to perform error handling.

5. The apparatus of claim 1, wherein the $CPU_{n+1}$ is a master CPU, the detection module further configured to:
send a non-critical interrupt to $CPU_{n+1}$;
send a critical interrupt to $CPU_{n+1}$ in response to the $CPU_{n+1}$ failing to respond to the non-critical interrupt; and
broadcast a group non-critical interrupt to all CPUs in response the $CPU_{n+1}$ failing to respond to the critical interrupt, wherein the group non-critical interrupt causes the CPUs to perform error handling.

6. The apparatus of claim 1, wherein each of the plurality of CPUs has a dedicated cache line in the shared memory for writing timestamps.

7. The apparatus of claim 1, the comparison module further configured to add additional time to the $timestamp_n$ prior to comparing the $timestamp_{n+1}$ to the $timestamp_n$.

8. The apparatus of claim 7, wherein the additional time accounts for time to move the $timestamp_{n+1}$ from $CPU_{n+1}$ to $CPU_n$.

9. The apparatus of claim 1, wherein the shared memory stores one or more timestamps generated by the plurality of CPUs in a global array.

10. A system comprising:
a shared memory that is shared by a plurality of central processing units (CPUs), wherein the plurality of CPUs are configured in a ring and each $CPU_n$ determines whether a $CPU_{n+1}$ that is logically adjacent to the $CPU_n$ in the ring has failed;
the $CPU_{n+1}$ of the plurality of CPUs configured to write a $timestamp_{n+1}$ to a global array in the shared memory, wherein the $CPU_n$ is a first core in a multi-core processor and the $CPU_{n+1}$ is a second core in the multi-core processing, the multi-core processor comprising a plurality of cores;
the $CPU_n$ of the plurality of CPUs configured to detect a failure in $CPU_{n+1}$, detecting a failure comprising the steps of:
retrieving the $timestamp_{n+1}$ from the shared memory;
comparing the $timestamp_{n+1}$ to a $timestamp_n$ generated by the $CPU_n$ and determining a delta value;
comparing the delta value with a threshold value and determining whether the $CPU_{n+1}$ has failed; and
in response to determining that the $CPU_{n+1}$ has failed, initiating error handling for the plurality of CPUs.

11. The system of claim 10, wherein the shared memory and the plurality of CPUs are components of a Fibre Channel Storage Host Adapter.

12. The system of claim 11, wherein the threshold value is set lower than a system threshold value for the Fibre Channel Storage Host Adapter.

13. The system of claim 10, wherein the $CPU_n$ is configured to read the $timestamp_n$ from hardware and write the $timestamp_n$ to the global array.

14. A method for detecting processor failure, the method comprising:
retrieving a $timestamp_{n+1}$ from a shared memory that is shared by a plurality of central processing units (CPUs), wherein the plurality of CPUs are configured in a ring and each $CPU_n$ determines whether a $CPU_{n+1}$ that is logically adjacent to the $CPU_n$ in the ring has failed, the $timestamp_{n+1}$ is written to the shared memory by the $CPU_{n+1}$, wherein the $CPU_n$ is a first core in a multi-core processor and the $CPU_{n+1}$ is a second core in a multi-core processor, the multi-core processor comprising a plurality of cores;
comparing by the $CPU_n$, the $timestamp_{n+1}$ to a $timestamp_n$ generated by the $CPU_n$ checking the $CPU_{n+1}$ for failure; and
in response to the difference between $timestamp_{n+1}$ and $timestamp_n$ being larger than a threshold value, the $CPU_n$ determining that there is a failure on $CPU_{n+1}$ and initiating error handling for the plurality of CPUs.

15. The method of claim 14, further comprising reading the $timestamp_n$ from hardware and writing the $timestamp_n$ to the shared memory.

16. The method of claim 14, wherein the $CPU_{n+1}$ is not a master CPU and the $CPU_n$ is not the master CPU, and wherein initiating error handling comprises the $CPU_n$ notifying the master CPU of the failure on $CPU_{n+1}$, and wherein the master CPU causes the plurality of CPUs to perform error handling.

17. The method of claim 14, wherein the $CPU_{n+1}$ is a master CPU, the method further comprising:
sending a non-critical interrupt to $CPU_{n+1}$;
sending a critical interrupt to $CPU_{n+1}$ in response to the $CPU_{n+1}$ failing to respond to the non-critical interrupt; and
broadcasting a group non-critical interrupt to all CPUs in response the $CPU_{n+1}$ failing to respond to the critical interrupt, wherein the group non-critical interrupt causes the CPUs to perform error handling.

18. The method of claim 14, wherein each of the plurality of CPUs has a dedicated cache line in the shared memory for writing timestamps.

19. The method of claim 14, further comprising adding additional time to the $timestamp_n$ prior to comparing the $timestamp_{n+1}$ to the $timestamp_n$.

* * * * *